United States Patent
Yokoi et al.

(10) Patent No.: US 8,706,492 B2
(45) Date of Patent: Apr. 22, 2014

(54) VOICE RECOGNITION TERMINAL

(75) Inventors: Kunio Yokoi, Nagoya (JP); Kazuhisa Suzuki, Kariya (JP); Masayuki Takami, Hamamatsu (JP); Naoyori Tanzawa, Kariya (JP)

(73) Assignee: DENSO CORPORATION, Kariya (JP)

( * ) Notice: Subject to any disclaimer, the term of this patent is extended or adjusted under 35 U.S.C. 154(b) by 475 days.

(21) Appl. No.: 13/170,284

(22) Filed: Jun. 28, 2011

(65) Prior Publication Data
US 2012/0004908 A1 Jan. 5, 2012

(30) Foreign Application Priority Data

Jun. 30, 2010 (JP) ................. 2010-149674

(51) Int. Cl.
*G10L 13/00* (2006.01)
(52) U.S. Cl.
USPC ............ 704/260; 704/251; 704/258; 715/727
(58) Field of Classification Search
USPC ............. 704/251, 258, 260; 715/727
See application file for complete search history.

(56) References Cited

U.S. PATENT DOCUMENTS

| 5,875,427 A * | 2/1999 | Yamazaki ............. 704/258 |
| 2002/0019736 A1 | 2/2002 | Kimura et al. |
| 2006/0224386 A1 | 10/2006 | Ikegami |

FOREIGN PATENT DOCUMENTS

| JP | H08339288 A | 12/1996 |
| JP | 2002-268666 A | 9/2002 |
| JP | 3862169 B2 | 10/2006 |
| JP | 3980449 B2 | 7/2007 |

OTHER PUBLICATIONS

Office Action mailed Jul. 30, 2013 in corresponding JP patent application No. 2010-149674 (and English translation).
Office Action mailed May 7, 2013 in corresponding Japanese application 2010-149674.

* cited by examiner

*Primary Examiner* — Daniel D Abebe
(74) *Attorney, Agent, or Firm* — Posz Law Group, PLC

(57) ABSTRACT

A voice recognition terminal executes a local voice recognition process and utilizes an external center voice recognition process. The terminal includes: a voice message synthesizing element for synthesizing at least one of a voice message to be output from a speaker according to the external center voice recognition process and a voice message to be output from the speaker according to the local voice recognition process so as to distinguish between characteristics of the voice message to be output from the speaker according to the external center voice recognition process and characteristics of the voice message to be output from the speaker according to the local voice recognition process; and a voice output element for outputting a synthesized voice message from the speaker.

12 Claims, 2 Drawing Sheets

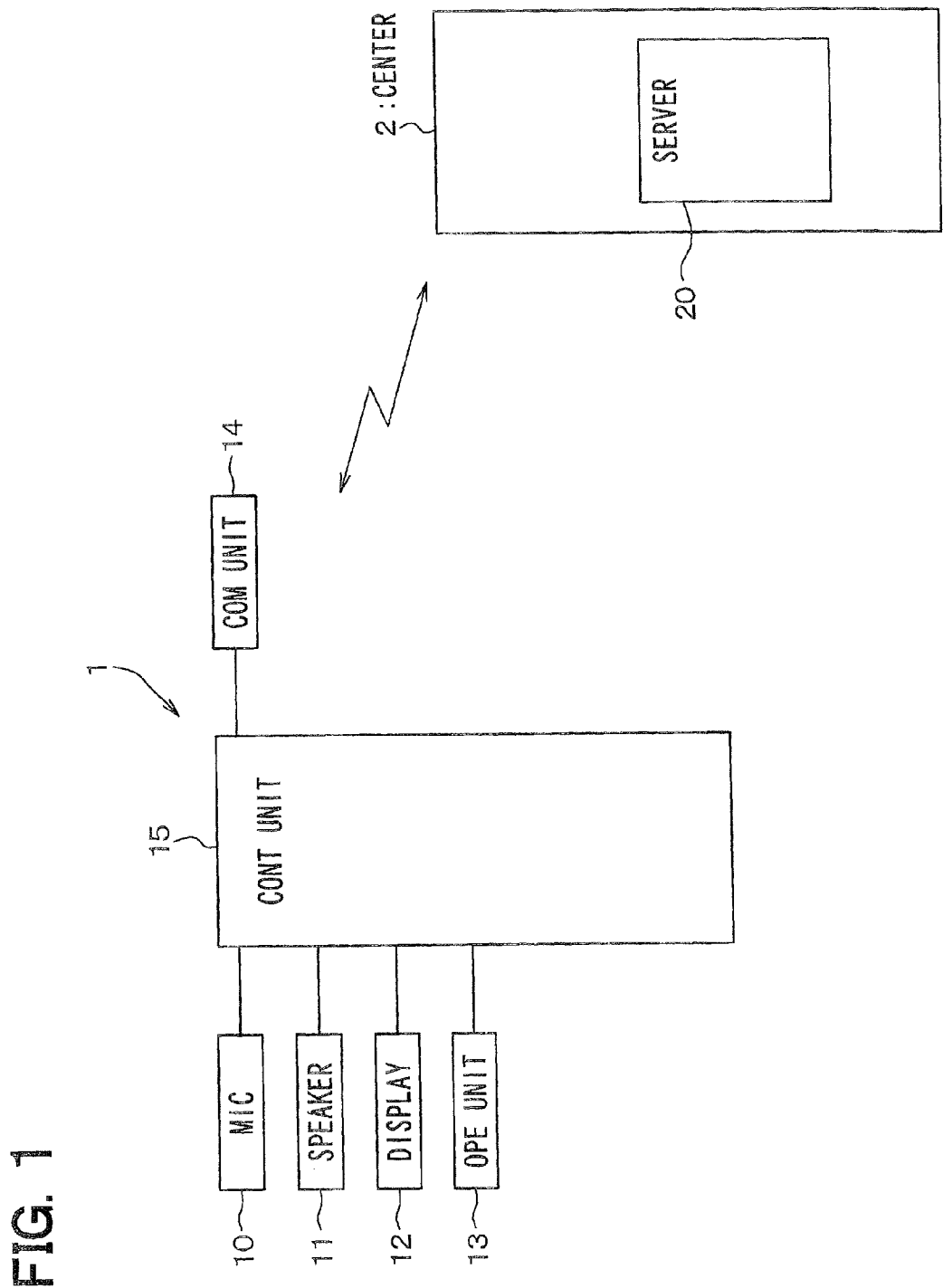

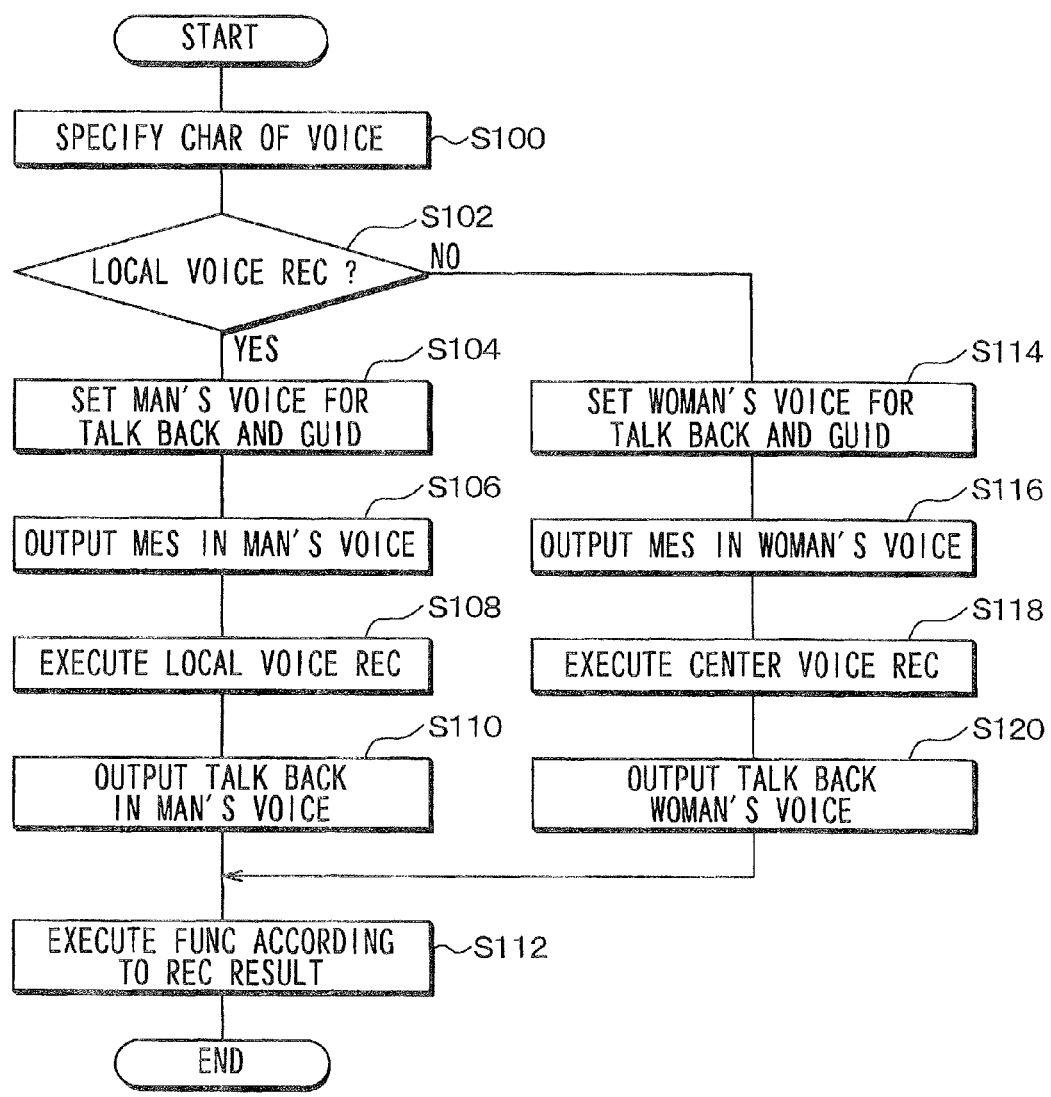

VOICE RECOGNITION TERMINAL

CROSS REFERENCE TO RELATED APPLICATION

This application is based on Japanese Patent Application No. 2010-149674 filed on Jun. 30, 2010, the disclosure of which is incorporated herein by reference.

TECHNICAL FIELD

The present invention relates to a voice recognition terminal, which executes local voice recognition and utilizes external voice recognition. The voice recognition terminal executes a process in order to provide the local voice recognition. The voice recognition terminal is coupled with an external system so that the voice recognition terminal utilizes the external voice recognition, which is executed by the external system.

BACKGROUND

Conventionally, an in-vehicle information terminal such as an in-vehicle navigation device has a HMI (i.e., human machine interface) with using a voice recognition process in the terminal so that safety and convenience are improved.

Alternatively, the terminal having the voice recognition function includes a communication element so that the terminal is coupled with an external center via the communication element. The voice recognition process is executed by the external center, and the terminal can search information with using the voice recognition process in the external center. This voice recognition process in the external center is defined as center side voice recognition process. This technique is described in Japanese Patent No. 3862169.

Here, in the voice recognition process, the number of words, which is audibly perceptive, and the structure of a sentence, which is recognizable, depend on a computer capacity since it is necessary to execute a large amount of calculations and to use a large amount of memory.

Thus, since the computer capacity of a calculation processor in an in-vehicle information terminal such as an in-vehicle navigation device is comparatively low, the voice recognition is limited to address recognition and/or comparatively easy word recognition and the like.

On the other hand, in the center side voice recognition process executed by an external center, the computer capacity of a calculation processor in the center is high, so that the number of recognizable words is large, and the comparatively complicated structure of the sentence is recognizable.

Thus, the category and the number of recognizable words, the structure of the recognizable sentence, and the purpose of the voice recognition in the local voice recognition process are different from those in the center side voice recognition process. Accordingly, when the in-vehicle terminal can utilize the local voice recognition process and the center side voice recognition process, it is necessary for the user to select one of the local voice recognition process and the center side voice recognition process.

However, in a conventional in-vehicle information terminal, when the user outputs a voice in order to utilize the voice recognition function, the user cannot easily distinguish which of the local voice recognition process or the center side voice recognition process is executed. Thus, the user cannot output the voice with distinguishing between the local voice recognition process and the center side voice recognition process.

For example, in the navigation device, when the user operates a switch such as a telephone number search switch, an address search switch, a facility search switch and the like according to a menu screen, the navigation device starts to execute the local voice recognition process. When the user operates a switch such as an information search switch, a news presenting switch and the like according to the menu screen, the navigation device starts to execute the center side voice recognition process. In this case, unless the user outputs the voice with distinguishing between the local voice recognition process and the center side voice recognition process, the navigation device may start to perform a unintended operation.

For example, when the navigation device executes the center side voice recognition process, and the user says "a good hamburger shop in Tokyo," the phrase of "a good hamburger shop in Tokyo" is recognized, and then, the navigation device displays search results of "a good hamburger shop in Tokyo." However, when the navigation device executes the local voice recognition process, and the user says "a good hamburger shop in Tokyo," the navigation device may not recognize the phrase of "a good hamburger shop in Tokyo" accurately. For example, the navigation device may mistake to recognize "a sandwich bar near the vehicle," and then, the navigation device displays search results of "a sandwich bar near the vehicle."

When the navigation device executes the local voice recognition process, and the user says "zoom-in" as an operation command for magnifying a map image, the navigation device recognizes the word of "zoom-in" as the operation command. Thus, the navigation device displays magnified map image. When the navigation device executes the center side voice recognition process, and the user says "zoom-in" as an operation command for magnifying a map image, the word of "zoom-in" may not be recognized. Instead, web sites may be searched with using the word "zoom-in" as a key word. This operation is the unintended operation for the user. Thus, the user is confused.

SUMMARY

In view of the above-described problem, it is an object of the present disclosure to provide a voice recognition terminal, which executes local voice recognition and utilizes external voice recognition. An user of the voice recognition terminal can easily distinguish between the local voice recognition and the external voice recognition.

According to an aspect of the present disclosure, a voice recognition terminal executes a local voice recognition process and utilizes an external center voice recognition process. The local voice recognition process provides to recognize a voice, and an external center communicated with the voice recognition terminal executes the external center voice recognition process for recognizing a voice. The terminal includes: a voice message synthesizing element for synthesizing at least one of a voice message to be output from a speaker according to the external center voice recognition process and a voice message to be output from the speaker according to the local voice recognition process so as to distinguish between characteristics of the voice message to be output from the speaker according to the external center voice recognition process and characteristics of the voice message to be output from the speaker according to the local voice recognition process; and a voice output element for outputting a synthesized voice message from the speaker.

In the above terminal, the user can easily distinguish between the local voice recognition process and the external center voice recognition process.

BRIEF DESCRIPTION OF THE DRAWINGS

The above and other objects, features and advantages of the present invention will become more apparent from the following detailed description made with reference to the accompanying drawings. In the drawings:

FIG. 1 is a block diagram showing a system of a voice recognition terminal according to an example embodiment; and FIG. 2 is a flowchart showing a process in a control unit.

DETAILED DESCRIPTION

First Embodiment

FIG. 1 shows a system of a voice recognition terminal according to a first embodiment. The terminal is a part of a navigation device 1 so that one of functions in the navigation device 1 provides a function of the voice recognition terminal. The navigation device 1 executes a voice recognition process by itself, and this recognition process is defined as a local voice recognition process. The navigation device 1 utilizes another voice recognition process executed by an external information center 2. The navigation device 1 is coupled with the external information center 2 so that the navigation device 1 communicates with the center 2. The voice recognition process executed by the center 2 is defined as a center side voice recognition process.

The device 1 includes a microphone 10, a speaker 11, a display 12, an operation unit 13, a communication unit 14 and a control unit 15.

The microphone 10 collects a voice output from a user of the navigation device 1. Further, the microphone 10 transmits a voice signal to the control unit 15 according to the voice from the user. The speaker 11 outputs a voice message corresponding to a voice signal output from the control unit 15.

The display 12 includes a liquid crystal display or the like, and displays an image corresponding to an image signal output from the control unit 15.

The operation unit 13 includes a touch switch mounted on a front surface of the display and a mechanical switch arranged around the display. The operation unit 13 transmits a signal to the control unit 15 according to a switch operation by the user.

The communication unit 14 communicates with an external device via a wireless communication network. In the present embodiment, the communication unit 14 communicates with a server 20 mounted in the center 2 via the wireless communication network.

The control unit 15 includes a computer having a CPU, a memory, a I/O element and the like. The CPU executes various processes according to a program stored in the memory.

The control unit 15 executes a voice analysis process. Specifically, when the server 20 in the center 2 connected to the device 1 via the communication unit 14 executes the center side voice recognition process, the control unit 15 executes the voice analysis process for analyzing a voice message to be output from the speaker 11. The voice message provides a talk back voice message and a guidance voice message. Based on the analyzed results, characteristics (such as a sex and a tone) of the voice message to be output from the speaker 11 are specified according to the center side voice recognition process. Alternatively, the sex (i.e., a man or a woman) may be specified based on a frequency analysis result, and a tone of the voice (i.e., a robotic tone or an operator tone) may be specified based on a prosody analysis result of the voice message. Alternatively, a background sound may be specified based on a voice message analysis result.

The control unit 15 includes a voice message synthesizing unit (not shown). When information of the sex and the tone of the voice message to be output from the speaker 11 is input into the voice message synthesizing unit, the voice message having the specified characteristics is synthesized by the voice message synthesizing unit, and then, the voice message is output from the speaker 11.

The navigation device 1 displays the menu screen according to the user operation. The menu screen provides a telephone number search for searching a facility corresponding to the telephone number input audibly, an address search for searching a facility corresponding to the address input audibly, a music search for searching the music corresponding to audibly input key words of the music, an information search for searching information about an audibly input content, a news search for searching a news audibly input, and the like.

In the present embodiment, when the user selects one of the telephone number search, the address search and the music search, the device 1 provides voice recognition service executed by the local voice recognition process. When the user selects one of the information search and the news search, the device 1 provides voice recognition service executed by the center side voice recognition process.

FIG. 2 shows a flowchart of the control unit 15. When the user inputs an instruction for starting the voice recognition process according to the menu screen, the control unit 15 executes the process shown in FIG. 2.

First, in step S100, the voice message analysis is performed on the voice message to be output from the speaker 11 according to the center side voice recognition process, so that the characteristics of the voice message are specified. Specifically, the sex of the voice message is specified by the frequency analysis. Further, the tone of the voice message is specified by the prosody analysis. Further, the background sound is specified. Here, in the present embodiment, the characteristics of the voice message to be output from the speaker 11 according to the center side voice recognition process are specified to the woman's voice and the operator tone of the voice. Further, it is determined to output the background sound.

Next, in step S102, the device 1 determines based on the content input by the user according to the menu screen whether the local voice recognition process is performed. Here, for example, when the user selects the telephone number search, the determination of step S102 is "YES." Then, in step S104, the characteristics of the voice message to be output from the speaker 11 according to the local voice recognition process is determined so as to be distinguishable between the voice message to be output from the speaker 11 according to the local voice recognition process and the voice message to be output from the speaker 11 according to the center side voice recognition process. Specifically, the characteristics of the voice message to be output from the speaker 11 according to the local voice recognition process are specified to the man's voice and the robotic tone of the voice, and it is determined not to output the background sound.

Next, in step S106, a guidance voice message is synthesized to be the characteristics of the voice determined in step S104, and then, the synthesized guidance voice message is output from the speaker 11. Specifically, the guidance voice message is synthesized to be the man's voice and the robotic tone of the voice without any background sound. Then, the synthesized voice message such as "please input (or say) the telephone number" is output from the speaker 11. The synthesized voice message provides the guidance voice message.

Here, the synthesized voice message includes a mechanically synthesized voice message, a natural voice linking message, a combination of the mechanically synthesized voice message and the natural voice linking message. The mechanically synthesized voice message is synthesized by a machine without using a natural voice so that the machine leaves the mechanically synthesized voice message. The natural voice linking message is prepared such that an actual voice of a person is recorded, and the actual voice, i.e., the natural voice is divided and/or linked to prepare the natural voice linking message. In this case, characteristics of the natural voice such as a pitch and a tone of the natural voice may be changed. Thus, the natural voice linking message is prepared based on the person leaving message.

Next, the local voice recognition process is executed in step S108. When the user says and inputs the phrase of "01-2345-6789," the voice of the user is recognized in the local voice recognition process.

Next, in step S110, a talk back voice message is synthesized to be the characteristics of the voice determined in step S104, and then, the synthesized talk back voice message is output from the speaker 11. Specifically, the talk back voice message is synthesized to be the man's voice and the robotic tone of the voice without any background sound. Then, the synthesized voice message such as "01-2345-6789?" is output from the speaker 11. The synthesized voice message provides the talk back voice message.

Next, in step S112, a function according to the voice recognition result is executed. Specifically, with using the recognized telephone number, the telephone number search is executed. The searched result is displayed on the display 12, and then, the process in FIG. 2 ends.

Further, when the user inputs an instruction for executing the information search, the determination of step S102 is "NO." Then, in step S114, the characteristics of the voice message to be output from the speaker 11 according to the center side voice recognition process is determined so as to be distinguishable between the voice message to be output from the speaker 11 according to the local voice recognition process and the voice message to be output from the speaker 11 according to the center side voice recognition process. Specifically, the characteristics of the voice message specified in step S100 are used for the characteristics of the voice message to be output from the speaker 11 according to the center side voice recognition process. More specifically, the characteristics of the voice message to be output from the speaker 11 according to the center side voice recognition process are specified to the woman's voice and the operator tone of the voice, and it is determined to output the background sound.

Next, in step S116, a guidance voice message is synthesized to be the characteristics of the voice determined in step S114, and then, the synthesized guidance voice message is output from the speaker 11. Specifically, the guidance voice message is synthesized to be the woman's voice and the operator tone of the voice with outputting the background sound. Then, the synthesized voice message such as "please input (or say) the search conditions" is output from the speaker 11. The synthesized voice message provides the guidance voice message.

Next, the center side voice recognition process is executed in step S118. When the user says and inputs the phrase of "a good hamburger shop in Tokyo," the voice of the user is recognized in the center side voice recognition process.

Next, in step S120, a talk back voice message is synthesized to be the characteristics of the voice determined in step S114, and then, the synthesized talk back voice message is output from the speaker 11. Specifically, the talk back voice message is synthesized to be the woman's voice and the operator tone of the voice with outputting the background sound. Then, the synthesized voice message such as "a good hamburger shop in Tokyo?" is output from the speaker 11. The synthesized voice message provides the talk back voice message.

Next, in step S112, a function according to the voice recognition result is executed. Specifically, with using the recognized search conditions, the information search is executed. The searched result is displayed on the display 12, and then, the process in FIG. 2 ends.

Here, steps S104 to S110 and S114 to S120 correspond to a voice message synthesizing element. Step S100 corresponds to a voice message characteristic specifying element. The memory of the control unit 15 corresponds to a memory element.

In the above device, the characteristics of the voice message to be output from the speaker 11 according to the local voice recognition process is synthesized so as to be distinguishable between the voice message to be output from the speaker 11 according to the local voice recognition process and the voice message to be output from the speaker 11 according to the center side voice recognition process. With using the synthesized voice message, the voice message according to the voice recognition process is output from the speaker 11. Thus, the user can easily distinguish between the local voice recognition process and the center side voice recognition process.

The characteristics of the voice message to be output from the speaker 11 according to the center side voice recognition are specified. Based on the specified characteristics, the characteristics of the voice message to be output from the speaker 11 according to the local voice recognition process is synthesized so as to be distinguishable between the voice message to be output from the speaker 11 according to the local voice recognition process and the voice message to be output from the speaker 11 according to the center side voice recognition process. Thus, even when the characteristics of the voice message to be output from the speaker 11 according to the center side voice recognition are changed, the user can easily distinguish between the local voice recognition process and the center side voice recognition process.

Further, since the background sound is output together with the voice message to be output from the speaker 11 according to the center side voice recognition process, the user can easily distinguish between the local voice recognition process and the center side voice recognition process when the user determines whether the background sound outputs from the speaker 11.

Further, the sex of the voice message output from the speaker 11 according to the center side voice recognition process is specified, and the voice message to be output from the speaker 11 according to the local voice recognition process is synthesized so as to have the sex of the voice message different from that of the specified sex according to the center side voice recognition process. Thus, the user can easily distinguish between the local voice recognition process and the center side voice recognition process when the user determines whether the sex of the voice message output from the speaker 11.

In the present embodiment, the characteristics of the voice message to be output from the speaker 11 according to the local voice recognition process is synthesized so as to be distinguishable between the voice message to be output from the speaker 11 according to the local voice recognition process and the voice message to be output from the speaker 11 according to the center side voice recognition process. Alternatively, the characteristics of the voice message to be output from the speaker 11 according to the center side voice recognition process may be synthesized so as to be distinguishable between the voice message to be output from the speaker 11 according to the local voice recognition process and the voice message to be output from the speaker 11 according to the center side voice recognition process. In this case, for example, when the sex of the voice message to be output from the speaker 11 according to the center side voice recognition process is a woman, the characteristics of the voice is synthesized to be a low-pitch tone (i.e., a bass tone) so that the voice message sounds like the man's voice. On the other hand, when the sex of the voice message to be output from the speaker 11 according to the center side voice recognition process is a man, the characteristics of the voice is synthesized to be a high-pitch tone (i.e., a soprano tone) so that the voice message sounds like the woman's voice.

In the present embodiment, the sex and the tone of the voice message and the background sound are changed so as to distinguish between the characteristics of the voice message to be output from the speaker 11 according to the center side voice recognition process and the characteristics of the voice message to be output from the speaker 11 according to the local voice recognition process. Alternatively, at least one of the sex and the tone of the voice message and the background sound may be changed. In the present embodiment, the voice message to be output from the speaker 11 according to the center side voice recognition process is output together with the background sound, and the voice message to be output from the speaker 11 according to the local voice recognition process is output without the background sound. Alternatively, the background sound in case of the local voice recognition process may be different from that in case of the center side voice recognition process although the background sound is output in both cases.

Second Embodiment

In the first embodiment, the voice analysis is performed on the voice message (i.e., the talk back voice message and the guidance voice message) to be output from the speaker 11 according to the center side voice recognition process so that the characteristics of the voice message are specified. In the present embodiment, information for specifying the characteristics of the voice message to be output from the speaker 11 according to the center side voice recognition process is stored in the memory of the control unit 15. Based on the information stored in the memory, the characteristics of the voice message to be output from the speaker 11 according to the center side voice recognition process are specified.

Specifically, according to basic setting screen of the navigation device 1, the characteristics of the voice message to be output from the speaker 11 according to the center side voice recognition process and the background sound are set by the user. Thus, when the user sets the characteristics of the voice message, which has been set as the characteristics according to the center side voice recognition process, in the basic setting screen, the set characteristics are stored in the memory of the control unit 15. After that, based on the information stored in the memory of the control unit 15, the characteristics of the voice message to be output from the speaker 11 according to the center side voice recognition process are specified.

Other Embodiments

In the above embodiments, the voice recognition terminal is a part of the navigation device 1 so that one of functions in the navigation device 1 provides a function of the voice recognition terminal. Alternatively, the voice recognition terminal may be a special purpose terminal for only executing the voice recognition.

In the first and second embodiments, at least one of the characteristics of the voice message to be output from the speaker 11 according to the local voice recognition process and the characteristics of the voice message to be output from the speaker 11 according to the center side voice recognition process is synthesized so as to differentiate the sex and the tone of the voice message and the background sound. Alternatively, a noise may be superimposed on the voice message. Alternatively, a voice distortion may be generated. Alternatively, a volume of the voice message may be reduced. Thus, quality of the voice message may be intentionally reduced.

Further, the device 1 may include multiple speakers 11, which are arranged at different positions. A part of the speakers 11, which output the voice message according to the center side voice recognition process, are different from another part of the speakers 11, which output the voice message according to the local voice recognition process, so that the direction, from which the voice message according to the center side voice recognition process is heard, is different from the direction, from which the voice message according to the local voice recognition process is heard. Alternatively, the volume of each speaker 11 may be adjusted so that the direction, from which the voice message according to the center side voice recognition process is heard, is different from the direction, from which the voice message according to the local voice recognition process is heard.

A message showing the local voice recognition process or the center side voice recognition process may be displayed on the display 12. Alternatively, a voice message showing the local voice recognition process or the center side voice recognition process may be output from the speaker 11.

When the man's voice is output, a man's character may be displayed. When the woman's voice is output, a woman's character may be displayed.

When the background sound is output from the speaker 11, it is considered that a recognition rate of the voice recognition may be reduced. Thus, the device 1 may include an adaptive filter for self-adapting based on an input signal so that the reduction of the recognition rate caused by the background sound is restricted.

Alternatively, when the center voice recognition process is executed, an auto antenna may extend. When the local voice recognition process is executed, the auto antenna may be folded. Thus, the user understands based on a state of an in-vehicle element whether the local voice recognition process or the center side voice recognition process is executed.

The above disclosure has the following aspects.

According to an aspect of the present disclosure, a voice recognition terminal executes a local voice recognition process and utilizes an external center voice recognition process. The local voice recognition process provides to recognize a voice, and an external center communicated with the voice recognition terminal executes the external center voice recognition process for recognizing a voice. The terminal includes: a voice message synthesizing element for synthesizing at least one of a voice message to be output from a speaker according to the external center voice recognition process and a voice message to be output from the speaker according to the local voice recognition process so as to distinguish between characteristics of the voice message to be output from the speaker according to the external center voice recognition process and characteristics of the voice message to be output from the speaker according to the local voice recognition process; and a voice output element for outputting a synthesized voice message from the speaker.

In the above terminal, the user can easily distinguish between the local voice recognition process and the external center voice recognition process.

Alternatively, the voice message synthesizing element may reduce quality of one of the voice message to be output from the speaker according to the local voice recognition process and the voice message to be output from the speaker according to the external center voice recognition process. In this case, the user can easily distinguish between the local voice recognition process and the external center voice recognition process according to the quality of the voice message output from the speaker.

Alternatively, the voice message synthesizing element may add a background sound on one of the voice message to be output from the speaker according to the local voice recognition process and the voice message to be output from the speaker according to the external center voice recognition process. In this case, the user can easily distinguish between the local voice recognition process and the external center voice recognition process according to the background sound on the voice message output from the speaker.

Alternatively, the voice message synthesizing element may add a background sound on the voice message to be output from the speaker according to the local voice recognition process. The voice message synthesizing element adds another background sound on the voice message to be output from the speaker according to the external center voice recognition process. The background sound is different from the another background sound. In this case, the user can easily distinguish between the local voice recognition process and the external center voice recognition process according to the background sound on the voice message output from the speaker.

Alternatively, the speaker may include a plurality of speaker elements. The voice message synthesizing element controls a volume of each speaker element so as to differentiate a direction, from which the voice message to be output from the speaker according to the external center voice recognition process is output, with a direction, from which the voice message to be output from the speaker according to the local voice recognition process is output. In this case, the user can easily distinguish between the local voice recognition process and the external center voice recognition process according to the direction, from which the voice message output from the speaker.

Alternatively, the voice recognition terminal may further include: a voice characteristic specifying element for specifying the characteristics of the voice message to be output from the speaker according to the external center voice recognition process. The voice message synthesizing element synthesizes the at least one of the voice message to be output from the speaker according to the external center voice recognition process and the voice message to be output from the speaker according to the local voice recognition process, based on specified characteristics of the voice message to be output from the speaker according to the external center voice recognition process. In this case, the user can easily distinguish between the local voice recognition process and the external center voice recognition process even when the characteristics of the voice message to be output from the speaker according to the external center voice recognition process is changed.

Alternatively, the voice recognition terminal may further include: a memory for storing information that specifies the characteristics of the voice message to be output from the speaker according to the external center voice recognition process. The voice characteristic specifying element specifies the characteristics of the voice message to be output from the speaker according to the external center voice recognition process, based on the information stored in the memory. The characteristics of the voice message to be output from the speaker according to the external center voice recognition process is specified based on the information stored in the memory.

Further, the voice characteristic specifying element may analyze the voice message to be output from the speaker according to the external center voice recognition process. The voice characteristic specifying element specifies the characteristics of the voice message to be output from the speaker according to the external center voice recognition process, based on an analysis result of the voice message to be output from the speaker according to the external center voice recognition process. The characteristics of the voice message to be output from the speaker according to the external center voice recognition process is specified based on analysis results of the voice characteristic specifying element.

Alternatively, the voice characteristic specifying element may specify a sex of the voice message to be output from the speaker according to the external center voice recognition process. The voice message synthesizing element synthesizes the voice message to be output from the speaker according to the local voice recognition process so as to differentiate a sex of the voice message to be output from the speaker according to the local voice recognition process from a specified sex of the voice message to be output from the speaker according to the external center voice recognition process. In this case, the user can easily distinguish between the local voice recognition process and the external center voice recognition process according to the sex of the voice message output from the speaker.

Alternatively, the voice characteristic specifying element may specify a tone of the voice message to be output from the speaker according to the external center voice recognition process. The voice message synthesizing element synthesizes the voice message to be output from the speaker according to the local voice recognition process so as to differentiate a tone of the voice message to be output from the speaker according to the local voice recognition process from a specified tone of the voice message to be output from the speaker according to the external center voice recognition process. In this case, the user can easily distinguish between the local voice recognition process and the external center voice recognition process according to the tone of the voice message output from the speaker.

Alternatively, the voice recognition terminal may further include: a voice characteristic specifying element for specifying a sex and a tone of the voice message to be output from the speaker according to the external center voice recognition process. The voice message synthesizing element adds a background sound on one of the voice message to be output from the speaker according to the local voice recognition process and the voice message to be output from the speaker according to the external center voice recognition process. The voice message synthesizing element synthesizes the voice message to be output from the speaker according to the local voice recognition process so as to differentiate a sex and a tone of the voice message to be output from the speaker according to the local voice recognition process from a specified sex and a specified tone of the voice message to be output from the speaker according to the external center voice recognition process.

Further, the sex is a male or a female, and the tone is a robotic tone or an operator tone.

While the invention has been described with reference to preferred embodiments thereof, it is to be understood that the invention is not limited to the preferred embodiments and constructions. The invention is intended to cover various modification and equivalent arrangements. In addition, while the various combinations and configurations, which are preferred, other combinations and configurations, including more, less or only a single element, are also within the spirit and scope of the invention.

What is claimed is:

1. A voice recognition terminal for executing a local voice recognition process and for utilizing an external center voice recognition process, wherein the local voice recognition process provides to recognize a voice, and an external center communicated with the voice recognition terminal executes the external center voice recognition process for recognizing a voice, the terminal comprising:
   a voice message synthesizing element for synthesizing at least one of a voice message to be output from a speaker according to the external center voice recognition process and a voice message to be output from the speaker according to the local voice recognition process so as to distinguish between characteristics of the voice message to be output from the speaker according to the external center voice recognition process and characteristics of the voice message to be output from the speaker according to the local voice recognition process; and
   a voice output element for outputting a synthesized voice message from the speaker.

2. The voice recognition terminal according to claim 1, wherein the voice message synthesizing element reduces quality of one of the voice message to be output from the speaker according to the local voice recognition process and the voice message to be output from the speaker according to the external center voice recognition process.

3. The voice recognition terminal according to claim 1, wherein the voice message synthesizing element adds a background sound on one of the voice message to be output from the speaker according to the local voice recognition process and the voice message to be output from the speaker according to the external center voice recognition process.

4. The voice recognition terminal according to claim 1, wherein the voice message synthesizing element adds a background sound on the voice message to be output from the speaker according to the local voice recognition process,
   wherein the voice message synthesizing element adds another background sound on the voice message to be output from the speaker according to the external center voice recognition process, and
   wherein the background sound is different from the another background sound.

5. The voice recognition terminal according to claim 1, wherein the speaker includes a plurality of speaker elements, and
   wherein the voice message synthesizing element controls a volume of each speaker element so as to differentiate a direction, from which the voice message to be output from the speaker according to the external center voice recognition process is output, with a direction, from which the voice message to be output from the speaker according to the local voice recognition process is output.

6. The voice recognition terminal according to claim 1, further comprising:
   a voice characteristic specifying element for specifying the characteristics of the voice message to be output from the speaker according to the external center voice recognition process, and
   wherein the voice message synthesizing element synthesizes the at least one of the voice message to be output from the speaker according to the external center voice recognition process and the voice message to be output from the speaker according to the local voice recognition process, based on specified characteristics of the voice message to be output from the speaker according to the external center voice recognition process.

7. The voice recognition terminal according to claim 6, further comprising:
   a memory for storing information that specifies the characteristics of the voice message to be output from the speaker according to the external center voice recognition process,
   wherein the voice characteristic specifying element specifies the characteristics of the voice message to be output from the speaker according to the external center voice recognition process, based on the information stored in the memory.

8. The voice recognition terminal according to claim 6, wherein the voice characteristic specifying element analyzes the voice message to be output from the speaker according to the external center voice recognition process, and
   wherein the voice characteristic specifying element specifies the characteristics of the voice message to be output from the speaker according to the external center voice recognition process, based on an analysis result of the voice message to be output from the speaker according to the external center voice recognition process.

9. The voice recognition terminal according to claim 6, wherein the voice characteristic specifying element specifies a sex of the voice message to be output from the speaker according to the external center voice recognition process, and
   wherein the voice message synthesizing element synthesizes the voice message to be output from the speaker according to the local voice recognition process so as to differentiate a sex of the voice message to be output from the speaker according to the local voice recognition process from a specified sex of the voice message to be output from the speaker according to the external center voice recognition process.

10. The voice recognition terminal according to claim 8, wherein the voice characteristic specifying element specifies a tone of the voice message to be output from the speaker according to the external center voice recognition process, and
    wherein the voice message synthesizing element synthesizes the voice message to be output from the speaker according to the local voice recognition process so as to differentiate a tone of the voice message to be output from the speaker according to the local voice recognition process from a specified tone of the voice message to be output from the speaker according to the external center voice recognition process.

11. The voice recognition terminal according to claim 1, further comprising:
a voice characteristic specifying element for specifying a sex and a tone of the voice message to be output from the speaker according to the external center voice recognition process,
wherein the voice message synthesizing element adds a background sound on one of the voice message to be output from the speaker according to the local voice recognition process and the voice message to be output from the speaker according to the external center voice recognition process, and
wherein the voice message synthesizing element synthesizes the voice message to be output from the speaker according to the local voice recognition process so as to differentiate a sex and a tone of the voice message to be output from the speaker according to the local voice recognition process from a specified sex and a specified tone of the voice message to be output from the speaker according to the external center voice recognition process.

12. The voice recognition terminal according to claim 11, wherein the sex is a male or a female, and
wherein the tone is a robotic tone or an operator tone.

* * * * *